US012112630B2

(12) United States Patent
Shao et al.

(10) Patent No.: US 12,112,630 B2
(45) Date of Patent: Oct. 8, 2024

(54) METHODS FOR RECOMMENDING PARKING LOTS IN SMART CITIES, INTERNET OF THINGS SYSTEMS, AND STORAGE MEDIUM THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yaqiang Quan, Chengdu (CN); Yong Li, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 154 days.

(21) Appl. No.: 18/048,516

(22) Filed: Oct. 21, 2022

(65) Prior Publication Data
US 2023/0060713 A1 Mar. 2, 2023

(30) Foreign Application Priority Data

Oct. 14, 2022 (CN) .......................... 202211257190.6

(51) Int. Cl.
*G08G 1/14* (2006.01)
*G08G 1/01* (2006.01)
(Continued)

(52) U.S. Cl.
CPC .......... *G08G 1/141* (2013.01); *G08G 1/0129* (2013.01); *G08G 1/146* (2013.01); *G08G 1/148* (2013.01); *G16Y 20/10* (2020.01); *G16Y 40/10* (2020.01)

(58) Field of Classification Search
CPC ........ G08G 1/141; G08G 1/146; G08G 1/148; G08G 1/0129; G16Y 20/10; G16Y 40/10
See application file for complete search history.

(56) References Cited

U.S. PATENT DOCUMENTS 10,169,993 B1 * 1/2019 Dance .................. G08G 1/0141
11,081,004 B1 * 8/2021 Higuchi ................ G08G 1/142
(Continued)

FOREIGN PATENT DOCUMENTS

CN 109584603 A 4/2019
CN 113256163 A 8/2021
(Continued)

OTHER PUBLICATIONS

Li, Wei et al., Parking Space Prediction Based on NB-IoT Technology and GA-BP Neural Network, Journal of Nanjing University of Aeronautics & Astronautics, 52(3): 454-459, 2020.
(Continued)

*Primary Examiner* — Hoi C Lau
(74) *Attorney, Agent, or Firm* — METIS IP LLC

(57) ABSTRACT

The embodiments of the present disclosure provide a method for recommending a parking lot in a smart city and an Internet of Things system, implemented based on a management platform of an Internet of Things system for recommending a parking lot in a smart city. The method includes: determining an arrival duration of a user reaching at least one candidate parking lot and a prediction time period corresponding to each candidate parking lot in the at least one candidate parking lot based on a user request; determining an occupation rate of the candidate parking lot during the prediction time period; and determining a recommended parking lot at least based on the occupation rate of the candidate parking lot during the prediction time period and parking lot information of the candidate parking lot.

18 Claims, 7 Drawing Sheets

(51) Int. Cl.
*G08G 1/04* (2006.01)
*G16Y 20/10* (2020.01)
*G16Y 40/10* (2020.01)

(56) References Cited

U.S. PATENT DOCUMENTS

| | | | |
|---|---|---|---|
| 11,371,853 B2 * | 6/2022 | Kamada | G01C 21/3685 |
| 2017/0316690 A1 * | 11/2017 | Charles | H04W 4/023 |
| 2019/0331498 A1 * | 10/2019 | Kamada | G08G 1/00 |
| 2020/0035101 A1 * | 1/2020 | Brooks | G08G 1/143 |
| 2021/0232588 A1 | 7/2021 | Liu et al. | |
| 2021/0233405 A1 | 7/2021 | Zhang et al. | |
| 2023/0060713 A1 * | 3/2023 | Shao | G08G 1/146 |
| 2023/0306321 A1 | 9/2023 | Shao et al. | |

FOREIGN PATENT DOCUMENTS

| | | | | |
|---|---|---|---|---|
| CN | 113257035 A | | 8/2021 | |
| CN | 113449780 A | | 9/2021 | |
| CN | 114038231 A | * | 2/2022 | |
| CN | 115424470 B | * | 12/2023 | G08G 1/0104 |
| GB | 2584862 A | * | 12/2020 | G01C 21/3685 |
| WO | WO-2020254418 A1 | * | 12/2020 | G01C 21/3685 |
| WO | WO-2024037819 A1 | * | 2/2024 | G08G 1/146 |
| WO | WO-2024065954 A1 | * | 4/2024 | G06F 17/16 |

OTHER PUBLICATIONS

Li, Wei et al., Parking Guidance System For Parking Lots Using IoT Technology, Automation and Instrumentation, 186: 234-235, 2015.

* cited by examiner

300

┌─────────────────────────────────────────────────────┐
│ Constructing a parking lot feature vector corresponding │ 310
│ to the candidate parking lot based on the parking lot │
│ capacity of the candidate parking lot, the internal │
│ structure of the parking lot, and the surrounding event │
│ holding information during the prediction time period │
└─────────────────────────────────────────────────────┘
                          ↓
┌─────────────────────────────────────────────────────┐
│ Obtaining a reference historical vector through      │ 320
│ retrieving in a vector database based on the parking lot │
│ feature vector                                       │
└─────────────────────────────────────────────────────┘
                          ↓
┌─────────────────────────────────────────────────────┐
│ Using the occupation rate of the parking lot         │ 330
│ corresponding to the reference historical vector as the │
│ occupation rate of the candidate parking lot during the │
│ prediction time period                               │
└─────────────────────────────────────────────────────┘

```
┌─────────────────────────────────────────────┐
│ Constructing a vehicle flow feature vector  │  410
│ corresponding to the first historical time  │
│                  period                     │
└─────────────────────────────────────────────┘
                      ↓
┌─────────────────────────────────────────────┐
│ Predicting a predicted number of entry and  │  420
│ exit vehicles corresponding to the second   │
│ historical time period through conducting   │
│ vector retrieval in the historical database │
│ based on the vehicle flow feature vector    │
└─────────────────────────────────────────────┘
                      ↓
┌─────────────────────────────────────────────┐
│ Determining whether the predicted occupation│
│ rate of the candidate parking lot during the│
│ prediction time period is reasonable based  │  430
│ on the difference between the predicted     │
│ number of entry and exit vehicles during the│
│ second historical time period and the actual│
│ number of entry and exit vehicles within the│
│        second historical time period        │
└─────────────────────────────────────────────┘
                      ↓
┌─────────────────────────────────────────────┐
│ In response to a determination that the     │
│ predicted occupation rate of the candidate  │  440
│ parking lot during the prediction time      │
│ period is reasonable, taking the predicted  │
│ occupation rate of the candidate parking lot│
│ during the prediction time period as the    │
│           final occupation rate             │
└─────────────────────────────────────────────┘
                      ↓
┌─────────────────────────────────────────────┐
│ In response to a determination that the     │
│ predicted occupation rate of the candidate  │
│ parking lot during the prediction time      │  450
│ period is not reasonable, adjusting the     │
│ predicted occupation rate of the candidate  │
│ parking lot during the prediction time      │
│ period, and using the adjusted occupation   │
│      rate as the final occupation rate      │
└─────────────────────────────────────────────┘
```

┌─────────────────────────────────────────────┐
│ Determining at least one evaluation factor and a score │
│ corresponding to each evaluation factor in the at least │
│ one evaluation factor based on the occupation rate of the │ 510
│ candidate parking lot during the prediction time period │
│ and the parking lot information of the candidate parking │
│ lot │
└─────────────────────────────────────────────┘
              │
              ▼
┌─────────────────────────────────────────────┐
│ Determining a weight value corresponding to each │ 520
│ evaluation factor, and determining the score of the │
│ candidate parking lot based on the weight value of each │
│ evaluation factor and the score of each evaluation factor │
└─────────────────────────────────────────────┘
              │
              ▼
┌─────────────────────────────────────────────┐ 530
│ Determining the recommended parking lot based on the │
│ score of the candidate parking lot │
└─────────────────────────────────────────────┘

┌─────────────────────────────────────────────────┐
│ Determining the score of the candidate parking lot │
│ through processing the parking lot features, candidate │
│ parking lot features, and user features historically selected │ — 610
│ by the user based on a score prediction model, the score │
│ prediction model being a machine learning model │
└─────────────────────────────────────────────────┘
                        │
                        ▼
┌─────────────────────────────────────────────────┐
│ Determining a first recommendation based on the score of │ — 620
│ the candidate parking lot │
└─────────────────────────────────────────────────┘
                        │
                        ▼
┌─────────────────────────────────────────────────┐
│ In combination with the occupation rate of the candidate │
│ parking lot during the prediction time period and the │ — 630
│ corresponding arrival duration in the first │
│ recommendation, determining a second recommendation │
│ in the first recommendation as the recommended parking │
│ lot │
└─────────────────────────────────────────────────┘

FIG. 6

METHODS FOR RECOMMENDING PARKING LOTS IN SMART CITIES, INTERNET OF THINGS SYSTEMS, AND STORAGE MEDIUM THEREOF

CROSS-REFERENCE TO RELATED DISCLOSURES

This application claims priority to Chinese Patent Application No. 202211257190.6, filed on Oct. 14, 2022, and the entire contents of which are hereby incorporated by reference.

TECHNICAL FIELD

The disclosure relates to the field of Internet of Things in smart cities, and in particular to methods for recommending a parking lot in smart cities and Internet of Things systems.

BACKGROUND

With the rapid development of urbanization, users' demand for vehicles is gradually increasing. However, with the rapid growth of the number of vehicles in the city, the difficulty of parking for users is also increased. During the peak period of vehicle use, it is often difficult for users to find parking spaces after reaching the parking lot, resulting in low parking efficiency. In addition, there are many types of parking lots, and the internal structures and charging situations of different parking lots are also very different. Different users also have different preferences for the parking lot, and how to recommend the desired parking lot to users is also very meaningful.

Therefore, a method for recommending a parking lot in a smart city and an Internet of Things system are desirable to be provided, which may recommend suitable parking lots for users in combination with the specific conditions when they travel to improve the recommendation efficiency and improve the user experience.

SUMMARY

In the first aspect, one or more embodiments of the disclosure provide a method for recommending a parking lot in a smart city, implemented based on a management platform of an Internet of Things system for recommending a parking lot in a smart city. The method includes: determining an arrival duration of a user reaching at least one candidate parking lot and a prediction time period corresponding to each candidate parking lot in the at least one candidate parking lot; determining an occupation rate of the candidate parking lot during the prediction time period; and determining a recommended parking lot at least based on the occupation rate of the candidate parking lot during the prediction time period and parking lot information of the candidate parking lot.

In the second aspect, one or more embodiments of the disclosure provide an Internet of Things system for recommending a parking lot in a smart city, including a management platform. The management platform is configured to: determine the arrival duration of the user reaching the at least one candidate parking lot and the prediction time period corresponding to each candidate parking lot in the at least one candidate parking lot; determine the occupation rate of the candidate parking lot during the prediction time period; and determine the recommended parking lot at least based on the occupation rate of the candidate parking lot during the prediction time period and the parking lot information of the candidate parking lot.

In the third aspect, one or more embodiments of the disclosure provides a non-transitory computer readable medium, the storage medium stores computer instructions, and when a computer reads the computer instructions, the computer executes the method described above in the first aspect.

According to the method for recommending the parking lot in the smart city and the system, the recommended parking lot is determined based on the occupation rate of the candidate parking lot during the prediction time period and the parking lot information of the candidate parking lot, and the optimal parking recommendation is provided for users by comprehensively considering a variety of factors so that users' parking time is saved, the congestion in the parking lot during the peak period is alleviated, and the user's parking experience is enhanced.

BRIEF DESCRIPTION OF THE DRAWINGS

This disclosure may be further explained in the form of exemplary embodiments, and these exemplary embodiments may be described in detail through the accompanying drawings. These embodiments are not limiting, and in these embodiments, the same numbers refer to the same structures, wherein:

FIG. 3 is an exemplary flowchart of determining the occupation rate of the candidate parking lot during the prediction time period according to some embodiments of this disclosure;

FIG. 4 is an exemplary flowchart of verifying the occupation rate of the candidate parking lot according to some embodiments of this disclosure;

FIG. 5 is an exemplary flowchart of determining the recommended parking lot according to some embodiments of this disclosure;

FIG. 6 is an exemplary flowchart of determining the recommended parking lot according to some embodiments of this disclosure;

DETAILED DESCRIPTION

Figure 1:
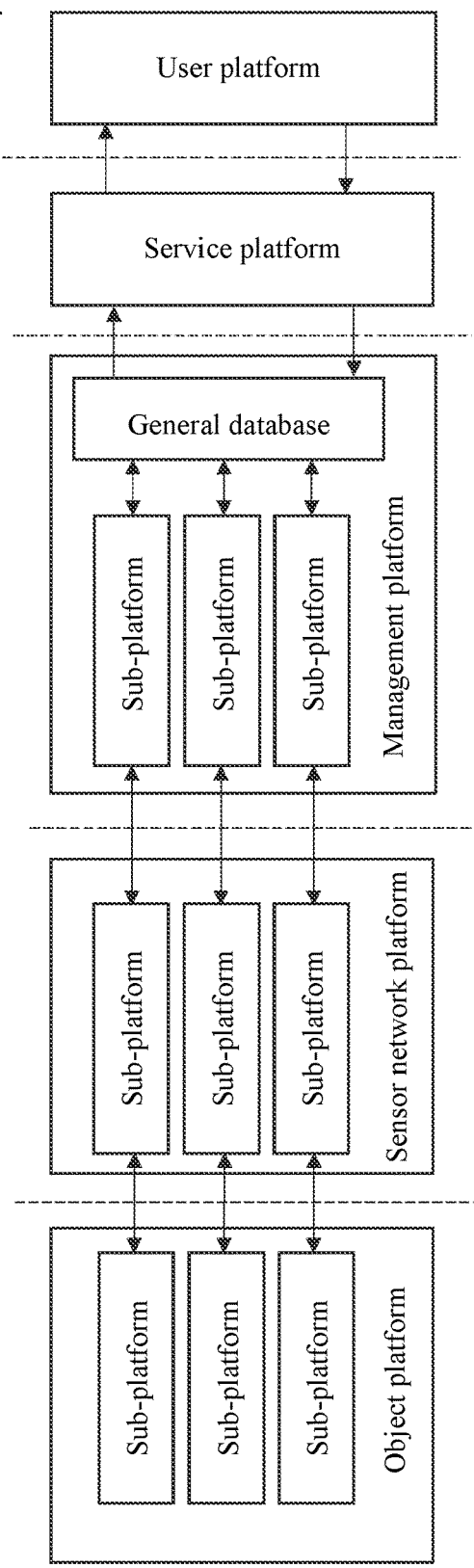
FIG. 1 is a schematic diagram of the system for recommending the parking lot in the smart city according to some embodiments of this disclosure.

In order to more clearly explain the technical scheme of the embodiments of this disclosure, the following briefly introduces the accompanying drawings used in the description of the embodiments. Obviously, the accompanying drawings in the following description are only some examples or embodiments of the present disclosure. For ordinary technicians skilled in the art, the present disclosure may also be applied to other similar situations according to these drawings without creative efforts. Unless obviously obtained from the context or the context illustrates otherwise, the same numeral in the drawings refers to the same structure or operation.

It should be understood that the words "system", "device", "unit" and/or "module" used in this disclosure are a method used to distinguish different components, elements, parts, portions or assemblies of different levels. However, if other words may achieve the same purpose, the words may be replaced by other expressions.

As shown in this disclosure and claims, unless the context clearly dictates otherwise, the words "a", "one", "a kind" and/or "the" are not intended to be specific in the singular and may include the plural. Generally, the terms "include" and "comprise" only imply that the clearly identified steps and elements are included, and these steps and elements do not constitute an exclusive list, and the method or equipment may also include other steps or elements.

Flowcharts are used in this disclosure to illustrate operations performed by the system according to the embodiments of this disclosure. It should be understood that the preceding or following operations are not necessarily performed in the exact order. Instead, each step may be processed according to the reverse order or simultaneously. Meanwhile, other operations may also be added to these processes, or a certain step or several steps may be removed from these processes.

FIG. 1 is an exemplary schematic diagram of the Internet of Things system for recommending the parking lot in the smart city according to some embodiments of this disclosure.

The Internet of Things system is an information processing system that includes part or all of a user platform, a service platform, a management platform, a sensor network platform, and an object platform. The user platform is a functional platform that realizes user perception information acquisition and control information generation. The service platform may connect the management platform and the user platform, and plays the function of perception information service communication and control information service communication. The management platform may realize the overall planning and coordination of the connection and cooperation between various functional platforms (e.g., the user platform and the service platform). The management platform brings together information about the Internet of Things operation system, and may provide perception management and control management functions for the Internet of Things operation system. The service platform may connect the management platform and the object platform, and plays the functions of perception information service communication and control information service communication. The user platform is a functional platform that realizes user perception information acquisition and control information generation.

The processing of information in the Internet of Things system may be divided into the processing process of user perception information and the processing process of control information. The control information may be information generated based on the user perception information. In some embodiments, the control information may include user demand control information, and the user perception information may include user inquiry information. The processing of the perception information is that the perception information is obtained by the object platform and transmitted to the management platform through the sensor network platform. The user demand control information is transmitted to the user platform through the service platform by the management platform, thereby realizing the control the sending of prompting information.

In some embodiments, when applying the Internet of Things system to urban management, the system may be called an Internet of Things system in a smart city.

As shown in FIG. 1, the Internet of Things system 100 for recommending the parking lot in the smart city includes a user platform 110, a service platform 120, a management platform 130, a sensor network platform 140 and an object platform 150.

The user platform 110 may be a platform for interaction with a user. The user may be a manager, a tourist, a car owner, etc. In some embodiments, the user platform 110 may be configured as terminal equipment. For example, the terminal equipment may include mobile equipment, a tablet computer, or the like, or any combination thereof. In some embodiments, the user platform 110 may be used to receive requests and/or instructions inputted by the user. For example, the user platform 110 may obtain an instruction of a user parking request through the terminal equipment. In some embodiments, the user platform 110 may feedback information to the user through the terminal equipment. For example, the user platform 110 may display a recommendation result of the parking lot to the user through the terminal equipment (e.g., a displayer).

The service platform 120 may refer to a platform capable of conveying the user demand and the control information, which connects the user platform 110 and the management platform 130. In some embodiments, the service platform 120 may be arranged in a centralized layout. The centralized layout refers to that the service platform 120 uniformly receiving, sending, and processing the data. For example, the service platform 120 may send user's parking request information to the management platform 130. As another example, the service platform 120 may send the recommendation result of the parking lot generated by the management platform 130 to the user platform 110.

The management platform 130 may refer to a platform for planning and coordinating the connection and cooperation among various functional platforms, gathering all the information of the Internet of Things, and providing perception management and control management functions for the Internet of Things operation system. For example, the management platform 130 may obtain the situation of a plurality of parking lots (e.g., idle parking spaces, traffic information around the parking lot, etc.) in the target area through the sensor network platform 140, and determine recommended parking lot information based on the situation of the parking lots. In some embodiments, the management platform 130 may interact with the service platform 120. For example, the management platform 130 may send the recommended parking information to the service platform 120. In some embodiments, the management platform 130 may include processing equipment and other components, and the processing equipment may be a server or a server group. In some embodiments, the management platform 130 may be a remote platform manipulated by management personnel, artificial intelligence, or preset rules.

In some embodiments, the management platform 130 may be arranged in a front distributed layout. The front distributed layout may refer to that the management platform includes a general database and a plurality of management sub-platforms. The plurality of sub-platforms store, process and/or transmit corresponding data according to different data sources. Each sub-platform may further aggregate the processed data to the general database. The management platform 130 analyzes, processes, and stores the aggregated data, and then transmits the aggregated data to the service platform 120 through the general database. In some embodiments, the plurality of sub-platforms included in the management platform 130 may be determined according to the preset areas in the city. For example, the management platform 130 may include the plurality of sub-platforms, such as a management sub-platform of area A, a management sub-platform of area B, and a management sub-platform of area C.

In some embodiments, in response to a user's parking demand, the management platform 130 may obtain relevant information about the parking lots in the corresponding area from the sensor network platform 140, and then determine the recommended parking lot. For example, the management platform 130 may store, analyze and process the relevant information of the parking lot in areas A, B, and C through the management sub-platform of area A, the management sub-platform of area B, and the management sub-platform of area C, and upload the relevant information to the general database of management platform 130; the management platform 130 may also further analyze and process the relevant data of the parking lot of the general database, and upload the recommended parking lot information to the service platform 120 through the general database.

The sensor network platform 140 may be a functional platform for managing sensor communication. In some embodiments, the sensor network platform 140 may connect to the management platform 130 and the object platform 150 to realize the functions of perception information sensor communication and control information sensor communication. In some embodiments, the sensor network platform 140 may include the plurality of sensor network sub-platforms.

In some embodiments, the sensor network platform 140 may be arranged in an independent layout. The independent layout may refer to that the sensor network platform 140 uses different sub-platforms for data storage, data processing and/or data transmission on data of different types or different data sources. In some embodiments, a plurality of sub-platforms included in the sensor network platform 140 may be determined according to the preset areas in the city, and may correspond to the sub-platforms of the management platform 130. For example, the sensor network platform 140 may set a sensor network sub-platform of area A, a sensor network sub-platform of area B, and a sensor network sub-platform of area C, which respectively correspond to the management sub-platform of area A, the management sub-platform of area B, and the management sub-platform of area C.

In some embodiments, in response to a query instruction issued by the sub-platforms of the management platform 130, the sensor network platform 140 may obtain the relevant information of the parking lot from the corresponding equipment in the object platform 150 through the corresponding sensor network sub-platforms, and upload the relevant information of the parking lot to the corresponding sub-platforms of the management platform 130.

The object platform 150 may be a functional platform for perception information generation. In some embodiments, the object platform 150 may be configured to include at least one set of monitoring equipment. In some embodiments, the object platform 150 may be used to obtain relevant information about various parking lots in the target area. For example, the object platform 150 may obtain vehicle information and idle parking space information in the parking lot based on monitoring equipment (e.g., camera equipment). As another example, the object platform 150 may obtain traffic information (e.g., traffic flow, pedestrian flow, etc.) around the parking lot based on the monitoring equipment. In some embodiments, the object platform 150 may send the obtained relevant information of each parking lot in the target area to the sensor network platform 140.

It should be noted that the application scenario is only provided for the purpose of explanation, and does not intend to limit the scope of this disclosure. For ordinary technical personnel skilled in the art, a variety of modifications or changes may be made according to the description of this disclosure. For example, the application scenario may also include a database. As another example, the application scenario may be implemented on other equipment to achieve similar or different functions. However, changes and modifications may not deviate from the scope of this disclosure.

Figure 2:
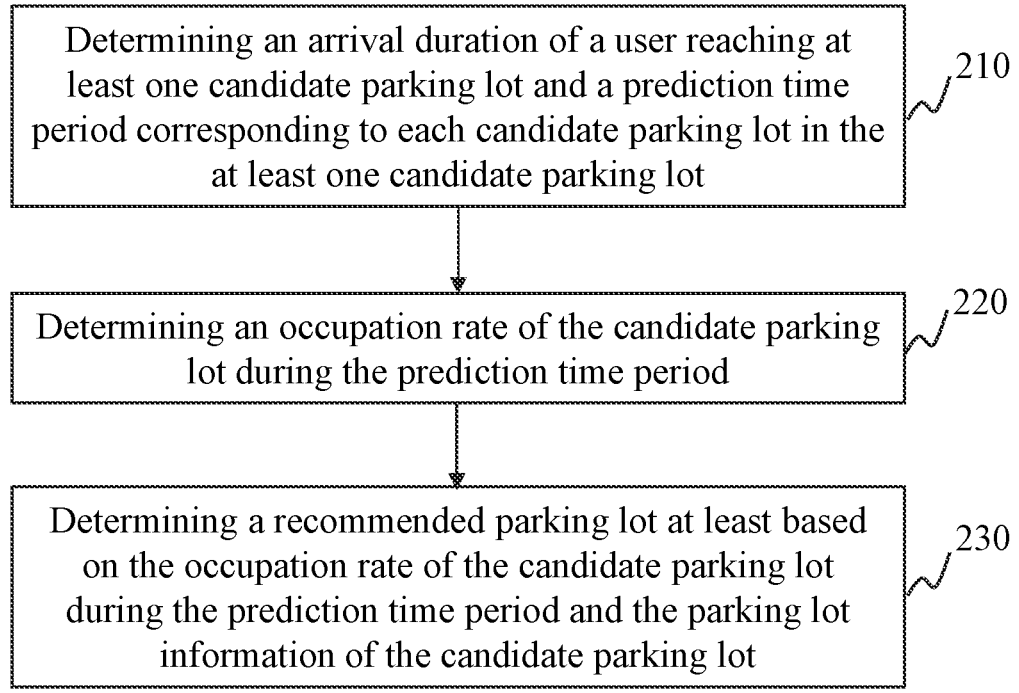
FIG. 2 is an exemplary flowchart of a method for recommending the parking lot in the smart city according to some embodiments of this disclosure.

FIG. 2 is an exemplary flowchart of the method for recommending the parking lot in the smart city according to some embodiments of this disclosure. In some embodiments, the method for recommending the parking lot in the smart city may be executed by a system for recommending the parking lot in the smart city 100 (e.g., management platform 130). For example, the process 200 may be stored in the storage equipment in the form of a program or instruction. When the management platform 130 executes the program or the instruction, the process 200 may be implemented. The operation schematic diagram of the process 200 presented below is illustrative. In some embodiments, the process may be accomplished by using one or more additional operations not described and/or one or more operations not discussed. In addition, the order of the operations of the process 200 shown in FIG. 2 and described below is not limiting.

Step 210, determining an arrival duration of a user reaching at least one candidate parking lot and a prediction time period corresponding to each candidate parking lot in the at least one candidate parking lot.

The user request may mean a request sent by the user through a user terminal (e.g., a mobile phone, a tablet computer, vehicle-mounted equipment, etc.) to find the parking lot. In some embodiments, the user request may be obtained based on the user platform 110.

In some embodiments, the user request may include at least one of a current vehicle location, an estimated departure time, and an estimated stay time. For example, the user inputs the estimated departure time and the estimated stay time through the user platform 110 and the user platform 110 is allowed to obtain the current vehicle location. The user platform 110 sends the user request including the current vehicle location, the estimated departure time, and the estimated stay time to the management platform 130 through the service platform 120, and the management platform 130 conducts subsequent processing.

In some embodiments, the estimated departure time may refer to a departure time to the parking lot inputted by the user. For example, the estimated departure time may be the current time or a certain time in the future. The current vehicle location refers to the location of the vehicle when the user sends the user request or the location of the vehicle at the estimated departure time. For example, the location of the vehicle at the current time may be obtained based on a positioning system of the vehicle. As another example, the location of the vehicle at the estimated departure time may be determined based on the corresponding positioning technology (e.g., the real-time dynamic carrier phase differential technology, etc.).

In some embodiments, the estimated stay time may refer to the possible parking time after arriving at the parking lot inputted by the user.

The candidate parking lot may refer to one or more parking lots that are convenient for the user to park after the management platform 130 calculates. In some embodiments, the management platform 130 determines the candidate parking lot according to the received information from the user request (e.g., the current vehicle location, the target location, the estimated departure time, the estimated stay time, etc.). The target location may be a range, for example, the range with the distance from the current vehicle location less than a preset distance may be regarded as the target location, and then the parking lot near the target location may be determined as the candidate parking lot.

The arrival duration may refer to the duration required for the user to reach the candidate parking lot predicted by the management platform 130. In some embodiments, the management platform 130 may predict the arrival duration according to the received information in the user request (e.g., the current vehicle location, the estimated departure time, etc.), for example, the management platform may generate a navigation path for the vehicle to reach the candidate parking according to the user request, and predict the arrival duration according to the navigation path.

In some embodiments, the prediction time period may include a time period corresponding to the time when the user arrives at the candidate parking lot and/or a time period corresponding to the time when the user leaves the candidate parking lot, and the length of the time period of the prediction time period may be preset. For example, every half hour from 0 o'clock to 24 o'clock may be regarded as a time period, and if the user is predicted to arrive at a candidate parking lot A at 12:10 based on the current time, the estimated departure time and the user's arrival duration, and the estimated stay time in the user request is 3 hours, it may be estimated that the user may leave the candidate parking lot A at 15:10, thus the prediction time period corresponding to the candidate parking lot A includes an arrival time period 12:00~12:30 and a departure time period 15:00~15:30.

Step 220, determining an occupation rate of the candidate parking lot during the prediction time period.

The occupation rate may refer to the ratio of the number of non-vacant parking spaces in the parking lot to the total number of parking spaces. For example, if the number of non-vacant parking spaces in the parking lot is 50 at a certain time, and the total number of parking spaces in the parking lot is 100, the occupation rate may be 50%. The occupation rate may be determined by the management platform 130. The management platform 130 may determine the occupation rate based on various methods such as statistics. For example, a monitoring device (e.g., a camera, a sensor, and other devices) may be installed on each parking space, the monitoring device is configured to monitor whether the parking space is occupied by a vehicle, the management platform 130 may count the number of non-vacant parking spaces in the parking lot, and the occupation rate is the ratio of the number of non-vacant parking spaces to the total number of parking spaces.

In some embodiments, the management platform 130 may determine the occupation rate during the prediction time period based on the parking lot information (e.g., a parking lot capacity, an internal structure of the parking lot, whether large events are held near the parking lot during the current time period, etc.). For example, the management platform 130 may divide a day into several time periods based on a preset time interval (e.g., 1 min, 5 min, 30 min, etc.), and determine, based on the historical data, the occupation rate of the candidate parking lot that is closest to the current user request situation during the prediction time period on a day, and use the occupation rate as the occupation rate during the prediction time period. For more explanation about determining the occupation rate during the prediction time period, please refer to the related description in FIG. 3.

Step 230, determining a recommended parking lot at least based on the occupation rate of the candidate parking lot during the prediction time period and the parking lot information of the candidate parking lot.

The parking lot information may be all information related to the parking lot, e.g., information related to the construction time, location, and charges of the parking lot.

In some embodiments, the parking lot information may include at least one of the internal structure of the parking lot and the charging standard. The internal structure of the parking lot may include the distribution of parking spaces and internal road conditions.

The recommended parking lot may refer to one or more parking lots suitable for user parking that are determined by the management platform 130 based on the candidate parking lots. If the number of the recommended parking lot is more than one, the final recommended parking lot may be determined based on the user's choice.

In some embodiments, the management platform 130 may determine the recommended parking lot at least based on the occupation rate of the candidate parking lot during the prediction time period and the parking lot information of the candidate parking lot. For example, when other conditions are the same, the management platform 130 may use the candidate parking lot with the smallest occupation rate of the parking lot corresponding to the arrival duration in the prediction time period as the recommended parking lot. As another example, when other conditions are the same, the management platform 130 may use the candidate parking lot that is least congested around the parking lot during the prediction time period among the candidate parking lots as the recommended parking lot, or when other conditions are the same, the management platform 130 may use the candidate parking lot with the lowest charge among the candidate parking lots as the recommended parking lot.

In some embodiments, the management platform 130 may determine the recommended parking lot at least based on the occupation rate of the candidate parking lot during the prediction time period, the internal structure of the candidate parking lot, the charging standard, and the arrival duration of the user reaching the candidate parking lot.

In some embodiments, the management platform 130 may determine the recommended parking lot based on the internal structure of the candidate parking lot. For example, when the occupation rate of a plurality of candidate parking lots is the same or similar, the candidate parking lot with wider internal space (e.g., road or parking space, etc.) of the parking lot is used as the recommended parking lot.

In some embodiments, the management platform 130 may determine the recommended parking lot based on the arrival duration of the user reaching the candidate parking lot. For example, when other conditions are the same, the management platform 130 may use the candidate parking lot with the shortest arrival duration of the user reaching the candidate parking lot among the candidate parking lots as the recommended parking lot, or the management platform 130 may use the candidate parking lot that is closest to the user's current location among the candidate parking lots as the recommended parking lot.

In some embodiments, when a plurality of conditions are different, the management platform 130 may assign a weight to each condition respectively, and determine the recommended parking lot based on the weighted summation.

According to the method for recommending the parking lot in the smart city, the recommended parking lot is determined based on the occupation rate of the candidate parking lot during the prediction time period and the parking lot information of the candidate parking lot, a variety of factors affecting the parking are comprehensively considered, and the best parking recommendation is provided for users, thereby saving users' parking time, alleviating the congestion of the parking lot during the peak period, and improving the parking experience of users.

FIG. 3 is an exemplary flowchart of determining the occupation rate of the candidate parking lot during the prediction time period according to some embodiments of this disclosure. In some embodiments, the process 300 may be executed by the management platform 130. As shown in FIG. 3, the process 300 may include the following steps.

Step 310, constructing a parking lot feature vector corresponding to the candidate parking lot based on the parking lot capacity of the candidate parking lot, the internal structure of the parking lot, and the surrounding event holding information during the prediction time period.

The parking lot capacity may refer to the number of vehicles that the parking lot may accommodate. In some embodiments, the parking lot capacity may include the number of parking spaces. In some embodiments, the parking lot capacity may be obtained based on a third-party platform (e.g., a parking lot management system, an urban parking system, etc.). For example, the management platform 130 may receive relevant data of the parking lot capacity sent by the third-party platform, or the relevant data of the parking lot capacity sent by the third-party platform may also be received by a server 120, and the server 120 sends the relevant data to the management platform 130 for subsequent processing.

The internal structure of the parking lot may refer to the distribution of parking spaces in the parking lot, such as the number of floors, partitions, area, and number of parking spaces in the parking lot. In some embodiments, the internal structure of the parking lot may be obtained based on the third-party platform (e.g., the parking lot management system, the urban parking system, etc.). The method of obtaining the internal structure of the parking lot may refer to the method of obtaining the parking lot capacity. For more explanations, please refer to the relevant descriptions of the method of obtaining the parking lot capacity in FIG. 3.

The surrounding event holding information may refer to the event holding information of the candidate parking lot within a preset distance, for example, events such as performances. In some embodiments, the surrounding event holding information may be obtained based on a third-party platform (e.g., big data platforms of local government departments or event organizers). The surrounding event holding information may be obtained by the management platform 130 based on crawling. For example, the management platform 130 may crawl a server or a website of the event organizer. The method of obtaining the surrounding event holding information may refer to the method of obtaining the parking lot capacity. For more descriptions, please refer to the relevant descriptions of the method of obtaining the parking lot capacity in FIG. 3.

In an example, the management platform 130 may obtain the surrounding event holding information (e.g., within 3 km) of the candidate parking lot during the prediction time period. If there is an event around the candidate parking lot during the current time period or the prediction time period, the management platform 130 considers that the candidate parking lot has a large flow of people, the surrounding traffic is relatively congested, or the parking space occupation rate is high, and prompts the user or reduces the recommendation priority of the candidate parking lot.

The parking lot feature vector is a vector configured to characterize the attributes or features of the candidate parking lot (e.g., the parking lot capacity of the candidate parking lot, the internal structure of the parking lot, and the surrounding event holding information during the prediction time period).

In some embodiments, one feature of the candidate parking lot corresponds to one element of the parking lot feature vector. Each element value of the parking lot feature vector may represent a feature value of the corresponding feature. For example, the parking lot feature vectors may be (a, b, c), where a represents the parking lot capacity of the candidate parking lot, b represents the internal structure of the parking lot, and c represents surrounding event holding information during the prediction time period. In some embodiments, the value of the element in the parking lot feature vector may be an actual value of the feature. In another embodiment, the actual situation of the features may be classified according to the preset corresponding relationship, and the classification value is used as the value of the element in the parking lot feature vector. For example, the internal structure of the parking lot is a single-storey structure represented by 1, and a double-storey structure represented by 2.

Step 320, obtaining a reference historical vector through retrieving in a vector database based on the parking lot feature vector.

The vector database includes a variety of historical parking lot feature vectors. The construction method of historical parking lot feature vectors may refer to the method of constructing the parking lot feature vector in the previous disclosure. In some embodiments, the vector database also preserves the occupation rate of the parking lot corresponding to each historical parking lot feature vector.

The reference historical vector may refer to the historical parking lot feature vector in the vector database with the highest similarity to the feature vector of the candidate parking lot.

In some embodiments, the management platform 130 may retrieve in the vector database based on the information of the candidate parking lot to determine the reference historical vector. For example, the management platform 130 may determine the vector distance between the parking lot feature vector and each historical parking lot feature vector in the vector database, and determine the historical parking lot feature vector corresponding to the minimum vector distance as the reference historical vector. The vector distance includes, but is not limited to, Euclidean distance, cosine distance, Markov distance, Chebyshev distance, and/or Manhattan distance, etc.

Step 330, using the occupation rate of the parking lot corresponding to the reference historical vector as the occupation rate of the candidate parking lot during the prediction time period.

In some embodiments, the management platform 130 may use the occupation rate of the parking lot corresponding to the reference historical vector as the occupation rate of the candidate parking lot during the prediction time period. For example, the parking lot feature vector is constructed based on the feature information of the candidate parking lot A during the predicted arrival duration, and the reference historical vector determined by retrieving in the vector database is the historical parking lot feature vector corresponding to the parking lot B during a certain historical time period. If the occupation rate corresponding to the historical parking lot feature vector is 60%, it may be considered that the occupation rate of the candidate parking lot A during the predicted arrival duration is 60%.

In some embodiments, when retrieving the parking lot feature vector corresponding to the candidate parking lot in the vector database, a plurality of reference historical vectors that meet the conditions may be retrieved, and a plurality of reference historical vectors correspond to a plurality of occupation rates, then the management platform 130 may use the average value of the plurality of occupation rates corresponding to the plurality of reference historical vectors as a predicted occupation rate of the parking lot during the prediction time period, so as to improve the reliability and accuracy of the data.

In some embodiments, the parking lot information further includes the historical number of entry and exit vehicle of the candidate parking lot, and the management platform 130 may, based on the historical number of entry and exit vehicle corresponding to the candidate parking lot during a first historical time period, verify the occupation rate of the candidate parking lot during the prediction time period, and determine a final occupation rate of the candidate parking lot during the prediction time period based on a verification result.

The first historical time period refers to a certain historical time period that has occurred in the past. For example, the current time is Jan. 30, 2020, and the first historical time period may be any historical time period before Jan. 30, 2020.

The historical number of entry and exit vehicle refers to the number of vehicles entering and leaving the candidate parking lot during the corresponding historical time period. The actual occupation rate of the candidate parking lot during the corresponding historical time period may be obtained based on the historical number of vehicles entering and leaving the candidate parking lot and the number of parking spaces in the candidate parking lot. For example, the actual occupation rate during the corresponding historical time period is $P=(a+b-c)/d$, where a is the parked vehicles in the candidate parking lot at the starting point of the corresponding historical time period, b is the number of vehicle entering the candidate parking lot during the corresponding historical time period, c is the number of vehicle leaving the candidate parking lot during the corresponding historical time period, and d is the number of parking spaces in the candidate parking lot.

In some embodiments, the predicted occupation rate of the candidate parking lot during the corresponding historical time period may be predicted in the aforementioned manner based on the relevant features of the candidate parking lot, for example, the predicted occupation rate during the corresponding historical time period is determined by constructing the feature vectors and the method of vector retrieval based on the parking lot capacity of the candidate parking lot and the internal structure of the parking lot, and large event holding information in the near the corresponding historical time period, etc. For specific descriptions, please refer to the previous section. In some embodiments, the management platform may determine the accuracy of the above prediction based on a difference between the actual occupation rate and the predicted occupation rate. For example, the smaller the difference is, the higher the accuracy of the prediction is.

After determining the accuracy of the prediction, the management platform may determine whether the predicted occupation rate of the candidate parking lot during the prediction time period is adjusted based on the accuracy, and then determine the final occupation rate of the candidate parking lot during the predicted time period. For example, if the accuracy is higher than a preset accuracy threshold (such as 90%), the predicted occupation rate may be used as the final occupation rate for determining the recommended parking lot. If the accuracy is less than or equal to the preset accuracy threshold, the predicted occupation rate of the candidate parking lot during the prediction time period may be adjusted based on the difference situation between the actual occupation rate obtained in the above verification and the predicted occupation rate. For example, if it is determined that the actual occupation rate is generally greater than the predicted occupation rate based on several verifications, the predicted occupation rate of the candidate parking lot during the prediction time period may be adaptively increased.

For further explanations of verifying the occupation rate, please see the description of verifying the occupation rate in FIG. 4.

In some embodiments of this disclosure, the occupation rate is verified based on the historical number of entry and exit vehicles, and the final occupation rate is determined, so that the Internet of Things system for recommending the parking lot in the smart city may determine the more accurate occupation rate of each candidate parking lot, thus improving the accuracy of the recommended parking lot.

In some embodiments of this disclosure, the reference historical vector is obtained by retrieving the parking lot feature vector in the vector database, and the occupation rate of the parking lot corresponding to the reference historical vector is used as the occupation rate of the candidate parking lot during the prediction time period, so that Internet of Things system for recommending the parking lot in the smart city may scientifically and accurately predict the occupation rate of the candidate parking lot during the prediction time period, and then recommend suitable parking lots for users, thereby improving the user's parking experience.

FIG. 4 is an exemplary flowchart of verifying the occupation rate of the candidate parking lot according to some embodiments of this disclosure. In some embodiments, the process 400 may be executed by the management platform 130. As shown in FIG. 4, the process 400 may include the following steps.

Step 410, obtaining the historical number of entry and exit vehicle corresponding to the candidate parking lot within the first historical time period, and constructing a vehicle flow feature vector corresponding to the first historical time period.

The first historical time period may refer to one or more historical time periods before the prediction time period. For example, the prediction time period is 12:00-13:00, the first historical time period may be 10:00-11:00, 9:00-10:00, etc. of a certain day in the past (e.g., 1 day, 3 days, 7 days, etc. in the past). A plurality of historical time periods may be a plurality of consecutive time periods.

The number of entry and exit vehicle includes the number of vehicles entering and leaving the parking lot during a certain time period. It may be understood that the number of entry and exit vehicles of the parking lot affects the occupation rate of the parking lot. For example, the larger the number of vehicles entering the parking lot is and the smaller the number of vehicles leaving the parking lot is, the greater the occupation rate is. The number of entry and exit vehicles may be determined by the difference between the number of vehicles entering the parking lot and the number of vehicles leaving the parking lot. For example, the number of vehicles entering the parking lot during the second historical time is 100, and the number of vehicles leaving the parking lot is 50. The number of entry and exit vehicles is 100−50=50. When the difference is positive, it means that the number of vehicles entering the parking lot is greater than the number of vehicles leaving the parking lot, and accordingly, the occupation rate of the parking lot may increase. When the difference is negative, it means that the number of vehicles entering the parking lot is less than the number of vehicles leaving the parking lot, and accordingly, the occupation rate of the parking lot may decrease.

The vehicle flow feature may be used to indicate the number of entry and exit vehicles of a certain parking lot during one or more consecutive time periods. In some embodiments, the number of vehicles entering and leaving the parking lot for at least one time period (e.g., 10:00-11:00) within a certain time period (e.g., 1 day, 3 days, etc. in the past) may be counted to determine the vehicle flow features corresponding to at least one time period. In some embodiments, the vehicle flow features may also include vehicle flow around the parking lot. The vehicle flow features are not limited here.

The vehicle flow feature vector may be a vector representation of the vehicle flow features. For example, the vehicle flow feature vector is (10:00, 11:00, 200, 100), where the elements of the vehicle flow feature vector represent the start time, the end time, the cumulative number of vehicles entering the parking lot from the start time to the end time, and the cumulative number of vehicles leaving the parking lot from the start time to the end time.

Step 420, predicting a predicted number of entry and exit vehicles corresponding to the second historical time period through conducting vector retrieval in the historical database based on the vehicle flow feature vector.

The second time period may refer to a historical time period after the first time period. For example, the first time period is 11:00-12:00 on Jan. 1, 2020 in the past, and the second historical time period is 12:00-13:00 on Jan. 1, 2020.

The vector retrieval may refer to a matching operation in a database based on elements in a target vector as keywords. In some embodiments, the management platform 130 may perform retrieval in the historical database based on the vehicle flow feature vector corresponding to the candidate parking lot within the first historical time period to determine a reference vehicle flow feature vector. The historical database may store historical vehicle flow feature vectors of the candidate parking lot during each historical time period and an actual number of entry and exit vehicles of the candidate parking lot during the next historical time period of the time period.

In some embodiments, the management platform 130 may perform vector retrieval in the historical database based on the vehicle flow feature vector constructed by the historical number of entry and exit vehicles corresponding to the candidate parking lot within the first historical time period to obtain a historical vehicle flow feature reference vector of the candidate parking lot, and use an actual number of entry and exit vehicles of the candidate parking lot during the next historical time period corresponding to the historical vehicle flow feature reference vector as a predicted number of entry and exit vehicles corresponding to the second historical time period.

In some embodiments, the management platform 130 may determine the historical vehicle flow feature reference vector based on a vector distance between the vehicle flow feature vector corresponding to the candidate parking lot and each historical vehicle flow feature vector in the historical database, for example, the historical vehicle flow feature vector corresponding to the minimum distance value is used as the historical vehicle flow feature reference vector. The vector distance includes, but is not limited to, Euclidean distance, cosine distance, Markov distance, Chebyshev distance, and/or Manhattan distance, etc.

Step 430, determining whether the predicted occupation rate of the candidate parking lot during the prediction time period is reasonable based on the difference between the predicted number of entry and exit vehicles within the second historical time period and the actual number of entry and exit vehicles within the second historical time period.

The difference between the predicted number of entry and exit vehicles within the second historical time period and the actual number of entry and exit vehicles within the second historical time period may be a difference between the actual number of entry and exit vehicles and the predicted number of entry and exit vehicles. When the difference is too large or too small, it means that the predicted number of entry and exit vehicles has a large error, and accordingly, the predicted occupancy rate of the candidate parking lot based on the predicted number of entry and exit vehicles during the prediction time period is unreasonable.

In some embodiments, a difference threshold of entry and exit vehicles may be preset, and when the absolute value of the difference is less than the difference threshold, it is determined that the predicted occupation rate of the candidate parking lot during the prediction time period is reasonable, otherwise the occupation rate is unreasonable. For example, the predicted number of entry and exit vehicles within the second historical time period is 40, the actual number of entry and exit vehicles within the second historical time period is 50, and the difference between the predicted number of entry and exit vehicles within the second historical time period and the predicted number of entry and exit vehicles within the second historical time period is −10. When the preset difference threshold is 20, the management platform 130 determines that the predicted occupation rate of the candidate parking lot during the prediction time period is reasonable.

Step 440, in response to a determination that the predicted occupation rate of the candidate parking lot during the prediction time period is reasonable, taking the predicted occupation rate of the candidate parking lot during the prediction time period as the final occupation rate.

In some embodiments, in response to the determination that the occupation rate during the prediction time period is reasonable, the management platform 130 may use the predicted occupation rate as the final occupation rate of the candidate parking lot.

Step 450, in response to a determination that the predicted occupation rate of the candidate parking lot during the prediction time period is not reasonable, adjusting the predicted occupation rate of the candidate parking lot during the prediction time period, and using the adjusted occupation rate as the final occupation rate.

In some embodiments, in response to the determination that the occupation rate during the prediction time period is not reasonable, the management platform 130 may adjust the predicted occupation rate.

In some embodiments, the management platform 130 may adjust the predicted occupation rate based on the actual number of entry and exit vehicles of the candidate parking lot within the second historical time period. The adjustment range may be determined based on the relationship between the actual number of entry and exit vehicles of the candidate parking lot within the second historical time period and the predicted number of entry and exit vehicles. For example, when the actual number of entry and exit vehicles of the candidate parking lot within the second historical time period is greater than the predicted number of entry and exit vehicles, it means that in fact, more vacancies of the candidate parking lot are occupied, so the predicted occupation rate may be increased, otherwise the predicted occupation may be decreased. The management platform 130 may determine the adjustment range based on the difference between the actual number of entry and exit vehicles of the candidate parking lot within the second historical time period and the predicted number of entry and exit vehicles. For example, the management platform 130 may make adjustment based on the ratio of the difference between the actual number of entry and exit vehicles of the candidate parking lot within the second historical time period and the predicted number of entry and exit vehicles to the actual number of entry and exit vehicles. Exemplarily, the management platform 130 may calculate a difference between the actual number of entry and exit vehicles of the candidate parking lot within the second historical time period and the predicted number of entry and exit vehicles during the second time period, and make adjustment based on the ratio of the difference to the actual number of entry and exit vehicles during the second time period. The difference may be positive and negative, and the ratio may also be positive and negative. The adjusted occupation rate K=predicted occupation rate of the parking lot*(1+ratio). For example, the actual number of entry and exit vehicles of the candidate parking lot within the second historical time period is 40, the predicted number of entry and exit vehicles within the second historical time period is 50, and the difference between the actual number of entry and exit vehicles of the candidate parking lot within the second historical time period and the predicted number of entry and exit vehicles within the second historical time period is −10, then the adjusted occupation rate K=predicted occupation rate of the parking lot*(1−0.25). The adjustment range may also be determined based on other feasible ways. For example, the total number of parking spaces in the candidate parking lot may be obtained based on the information of the candidate parking lot, and the adjustment range may be set based on the ratio of the actual number of entry and exit vehicles to the total number of parking spaces. This disclosure does not limit the adjustment method of the occupation rate.

In some embodiments of the present disclosure, by adjusting the predicted occupation rate, the finally determined occupation rate may be more accurate and conform to the actual situation.

FIG. 5 is an exemplary flowchart of determining the recommended parking lot according to some embodiments of this disclosure. In some embodiments, the process 500 may be executed by the management platform 130. As shown in FIG. 5, the process 500 may include the following steps.

Step 510, determining at least one evaluation factor and a score corresponding to each evaluation factor in the at least one evaluation factor based on the occupation rate of the candidate parking lot during the prediction time period and the parking lot information of the candidate parking lot.

The evaluation factor may refer to the factors that affect the user's choice of the parking lot, for example, the internal structure of the parking lot, the charging standard, and the difficulty of parking.

The evaluation factor may be determined based on a historical parking record of the user. Exemplarily, statistical processing of user parking records in a plurality of parking lots may be performed, popular and unpopular parking lots may be determined based on the number of the user parking records in each parking lot, and the relevant feature of the popular and unpopular parking lots are compared and analyzed to determine the evaluation factors, for example, the road section where the parking lot is located, the parking charging, and the structure of the parking lot (such as area size, parking space capacity, floor, etc.). The evaluation factor may also be determined based on other methods, for example, conducting questionnaires, interviews, etc. on different vehicle owners.

In some embodiments, the evaluation factor includes at least one of the occupation rate of the candidate parking lot during the prediction time period, the internal structure of the candidate parking lot, the charging standard, and the arrival duration.

In some embodiments, a score may be assigned to each evaluation factor. The score of the evaluation factor may indicate the contribution that affects the user's choice of the parking lot. The score may be a numeric value within the interval [0, 1]. The score of the evaluation factor is higher, indicating that it is easier for the user to make a choice for the parking lot.

The score of the evaluation factor may be determined based on various rules. For example, for a charging standard of the evaluation factor, a standard price during a certain time period may be set as N (e.g., the price per hour during a certain time period, etc.) according to the price level of the city, the salary level, the overall charging price of the parking lot, etc., and the score corresponding to this standard price is set as 0.5 point. If the charging of a certain candidate parking lot during the corresponding time period exceeds N, the score of the charging standard of the evaluation factor of the parking lot is correspondingly reduced (e.g., it is reduced to 0.4 points, 0.3 points, etc. based on the excessed ratio). If the charging of a certain candidate parking lot during the corresponding time period is less than N, the score of the charging standard evaluation factor of the parking lot is correspondingly increased (e.g., it is increased to 0.6 points, 0.7 points, etc. based on the reduced ratio).

The score of the evaluation factor may also be determined based on the relative situation between the candidate parking lots. For example, 4 candidate parking lots are A, B, C, and D. For an arrival duration of the evaluation factor, the score of the evaluation factor corresponding to the parking lot with the shortest arrival duration (e.g., parking lot A is 30 minutes) may be set as 1 point, and the score is reduced (e.g., by 0.1 points) by following the difference of the arrival duration of each candidate parking lot (e.g., every difference of 30 minutes) to determine the score of the arrival duration of the evaluation factor.

Step 520, determining a weight value corresponding to each evaluation factor, and determining the score of the candidate parking lot based on the weight value of each evaluation factor and the score of each evaluation factor.

In some embodiments, the weight value corresponding to each evaluation factor may be determined based on the impact of each evaluation factor on the candidate parking lot selected by the user. The weight value may be determined based on experience. For example, the weight of each evaluation factor may be set based on social experience.

In some embodiments, the weight value corresponding to each evaluation factor may also be determined based on user preferences (e.g., obtaining user input or choice through the terminal equipment). The user preferences may represent the degree of attention different users pay to each different evaluation factor. For example, users pay different degrees of attention to the occupation rate, the internal structure, the charging standard, the arrival duration, etc. of the parking lot. The evaluation factor with a higher degree of attention has a larger corresponding weight. Exemplarily, a plurality of users may be allowed to select each of a plurality of evaluation factors, and the ratios of each evaluation factor selected by the user may be counted to determine the weight of each evaluation factor.

In some embodiments, the score of the candidate parking lot may be determined by a weighted summation of the scores of the various evaluation factors. For example, the score of the candidate parking lot is $S=\Sigma_{i=1}^{n}(D_i*W_i)$, where n is the total number of evaluation factors, $D_i$ is the score of each evaluation factor in n evaluation factors, and $W_i$ is the weight value of the corresponding evaluation factor. Exemplarily, for a certain candidate parking lot, the scores of the occupation rate, the internal structure of the candidate parking lot, the charging standard, and the arrival duration are respectively 0.8 point, 0.7 point, 1 point, and 0.5 point, and the weights are respectively 0.5, 0.1, 0.2 and 0.2, then the score of the candidate parking lot $S=(0.8*0.5)+(0.7*0.1)+(1*0.2)+(0.5*0.2)=0.77$ points.

Step 530, determining the recommended parking lot based on the score of the candidate parking lot.

In some embodiments, the management platform 130 may sort the candidate parking lots in a descending manner based on the scores of the plurality of candidate parking lots, and determine one or more candidate parking lots with a top score as the recommended parking lot.

Some embodiments of the present disclosure determine the score of each candidate parking lot by setting a plurality of evaluation factors and the weights, and determine the recommended parking lot based on the score of the candidate parking lot, so that the recommended parking lot may be more in line with the actual situation.

FIG. 6 is an exemplary flowchart of determining the recommended parking lot according to some embodiments of this disclosure. In some embodiments, the process 600 may be executed by the management platform 130. As shown in FIG. 6, the process 600 may include the following steps.

Step 610, determining the score of the candidate parking lot through processing the parking lot features, candidate parking lot features, and user features historically selected by the user based on a score prediction model.

In some embodiments, the score prediction model may be a machine learning model, such as a recurrent neural network model, a convolutional neural network or other custom model structures, or the like, or any combination thereof. The management platform 130 at least inputs the parking lot features, the candidate parking lot features, and the user features historically selected by the user into the score prediction model to obtain the score of the candidate parking lot. For the detailed content of the score prediction model, please refer to the description of the score prediction model in FIG. 7.

Step 620, determining a first recommendation based on the score of the candidate parking lot.

The first recommendation is the candidate parking lot that may be screened from the candidate parking lot, which is possible to be a recommended parking lot. In some embodiments, the first recommendation may include the candidate parking lot with the score meeting a preset requirement. The preset requirement may be the top N parking lot with the score higher than the preset score threshold or the highest score.

Step 630, in combination with the occupation rate of the candidate parking lot during the prediction time period and the corresponding arrival duration in the first recommendation, determining a second recommendation in the first recommendation as the recommended parking lot.

The second recommendation is the candidate parking lot selected from the first recommendation as the recommended parking lot. In some embodiments, the management platform 130 may determine a secondary evaluation score of each candidate parking lot in the first recommendation in combination with the occupation rate of the candidate parking lot during the prediction time period and the corresponding arrival duration in the first recommendation, and determine the second recommendation as the recommended parking lot based on the secondary evaluation score. For example, the management platform may score each candidate parking lot in combination with the occupation rate and the arrival duration of each candidate parking lot in the first recommendation, and perform a weighted summation of the score of each candidate parking lot on the occupation rate and the arrival duration as the secondary evaluation score of each candidate parking lot in the first recommendation, and then determine the second recommendation based on the secondary evaluation score. For example, the candidate parking lot with the highest secondary evaluation score is used as the second recommendation, or the first recommendation is ranked in a descending manner according to the secondary evaluation score, and the N candidate parking lots with the top comprehensive score are selected as the second recommendation.

In some embodiments, the management platform 130 may set the weight corresponding to the occupation rate and the arrival duration according to the user's preferences. For example, if the user pays more attention to the arrival duration, the weight of the arrival duration is greater.

Some embodiments of this disclosure determine the first recommendation in the candidate parking lot based on the score prediction model, and determine the second recommendation in the first recommendation as the recommended parking lot, so that the Internet of Things system for recommending the parking lot in the smart city may predict the occupation rate and the arrival duration of each time period to obtain the first recommendation, and further select the parking lot that is most suitable for the user to park in the first recommendation based on the user's choice or preferences, thus making the Internet of Things system for recommending the parking lot in the smart city both scientific and interactive.

Figure 7:
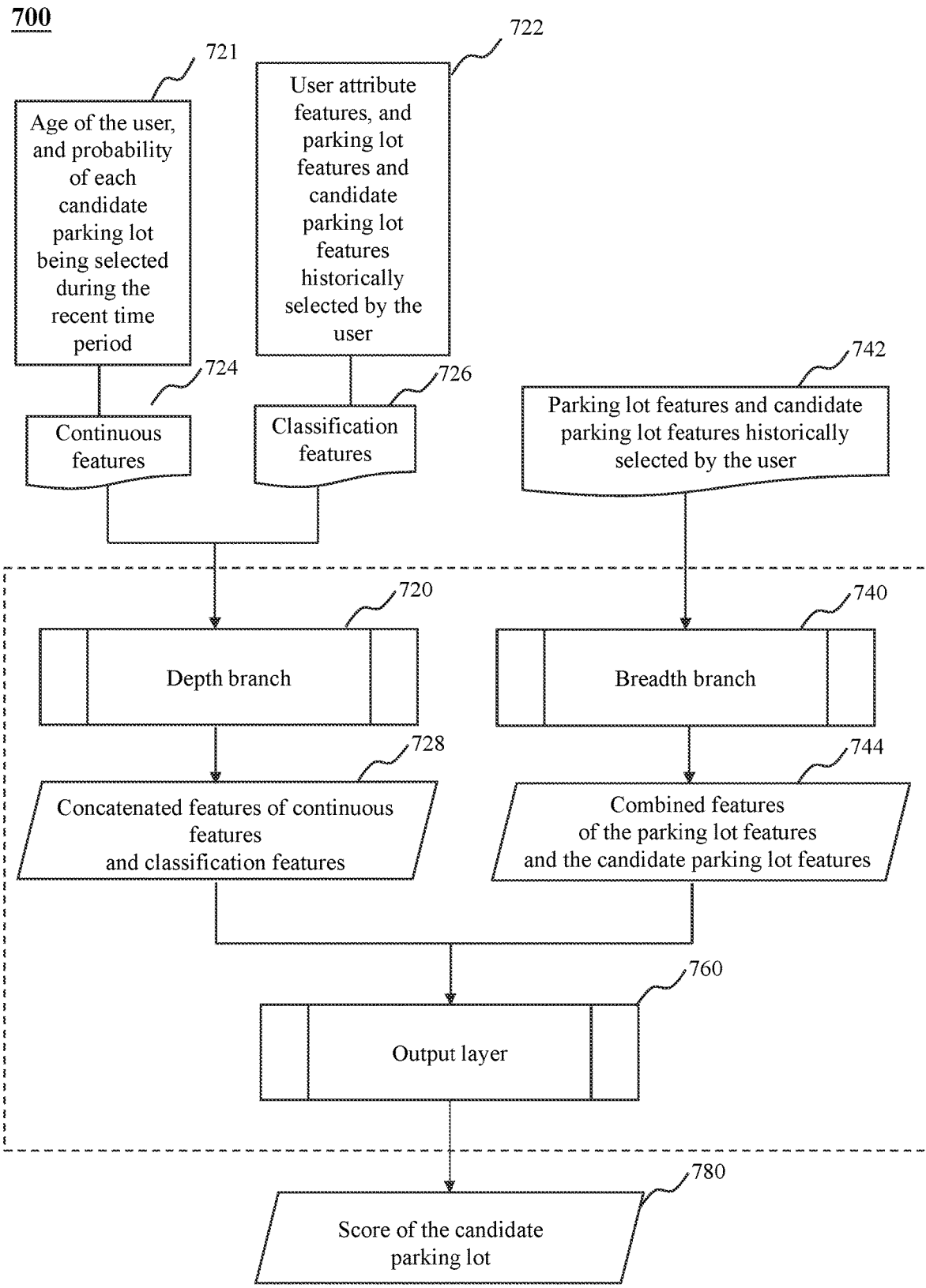
FIG. 7 is an exemplary schematic diagram of the score prediction model according to some embodiments of this disclosure.

FIG. 7 is an exemplary schematic diagram of the score prediction model according to some embodiments of this disclosure.

In some embodiments, the score of the candidate parking lot may be determined based on the processing of the parking lot features, the candidate parking lot features, and the user features historically selected by the user through the score prediction model.

The score prediction model may refer to a model configured to determine the score of the candidate parking lot. In some embodiments, the score prediction model is a trained machine learning model. The score prediction model may be any one or a combination of a recurrent neural network model, a convolutional neural network, or other custom model structures.

In some embodiments, the score prediction model includes a depth branch, a breadth branch, and an output layer. As shown in FIG. 7, the score prediction model 700 includes a depth branch 720, a breadth branch 740 and an output layer 760.

The depth branch 720 may be used to determine the parking lot features that the user is interested in. For example, the parking lot features that the user is interested in may be selected based on the parking lots frequently selected by the user in history. For example, if the parking lot frequently selected by the user has a lower charging standard, it may be considered that the low charging standard of the parking lot is the parking lot feature that the user is interested in. Correspondingly, for a plurality of candidate parking lots, the candidate parking lot with a lower charging standard has a higher score. In some embodiments, the depth branch 720 may be the deep neural network model.

The breadth branch 740 may be used to determine the parking lot features in the historical parking record of the user. For example, the parking lot that the user has selected may be determined based on the parking records of a plurality of parking lots of the user in history, and the relevant features of the parking lot may be obtained as a basis for recommending a parking lot to the user. Exemplarily, if the user parked in an open-air parking lot for many times, the open-air parking lot has a higher score in the two parking lots with open-air features and underground features, and may be preferentially recommended to the user. In some embodiments, the breadth branch 740 may be a logical regression model.

The output layer 760 may be used to process the output of the breadth branch 740 and the output of the depth branch 720 to determine the score of the candidate parking lot. In some embodiments, the output layer 760 may be the deep neural network model.

In some embodiments, as shown in FIG. 7, the score prediction model 700 inputs continuous features 724, classification features 726, parking lot features and candidate parking lot features historically selected by the user 742, processes the input features through the depth branch 720, the breadth branch 740 and the output layer 760 of the score prediction model 700, and takes the score of the candidate parking lot 780 outputted by the output layer 760 as the final output of the score prediction model 700.

In some embodiments, the input of the depth branch 720 includes the continuous features 724 and the classification features 726.

In some embodiments, the continuous features 724 may include age of the user, and probability of each candidate parking lot being selected during the recent time period 721.

In some embodiments, the probability of each candidate parking lot being selected during the recent time period may be determined based on historical statistics. For example, the management platform 130 may obtain the user parking records of a plurality of candidate parking lots during the recent time period (e.g., the last 1 day, 2 days, 7 days) and perform analysis and processing on the user parking records to determine the probability of each candidate parking lot being selected. It may be understood that, for a plurality of candidate parking lots with close distances (e.g., a certain preset distance range) in a certain area, the more parking records the user has, the higher the probability that the parking lot is selected by the user is.

Correspondingly, the probability of each candidate parking lot being selected may be determined based on the ratio of the number of the user parking records to the number of all parking records in each candidate parking lot during the recent time period. For example, in the last day, the user parking records of candidate parking lots A, B, and C are 50, 20, and 30, respectively, each recorded value may be the number of vehicles parked in the candidate parking lot during the corresponding time period, or obtained by proportionally enlarging or reducing the number of vehicles parked in the candidate parking lot during the corresponding time period. Then the probability of the candidate parking lot A being selected is 50/(50+20+30)=0.5, and similarly, the probability of the candidate parking lot B and the candidate parking lot C being selected is 0.2 and 0.3.

In some embodiments, the classification features 726 include user attribute features. The user attribute features may include a user name, age, gender, preference features, etc. The preference features include user's preferences for evaluation factor of the parking lot. For more description about the evaluation factors of the parking lot, please see FIG. 5 and its descriptions.

In some embodiments, the classification features 726 also include the parking lot features and the candidate parking lot features historically selected by the user. For the relevant content of the parking lot features, please see FIG. 5 and its description.

In some embodiments, the depth branch 720 may process the continuous features 724 and the classification features 726. The output of the depth branch 720 is the concatenated features 728 of the continuous features and classification features.

In some embodiments, the input of the breadth branch 740 includes the parking lot features and the candidate parking lot features historically selected by the user. In some embodiments, the output of the breadth branch 740 is combined features 744 of the parking lot features and the candidate parking lot features.

In some embodiments, the input to the output layer 760 is the concatenated features 728 of the continuous features and classification features outputted by the depth branch 720 and the combined features 744 of the parking lot features and the candidate parking lot features outputted by the breadth branch 740. The output of the output layer 760 is the score of the candidate parking lot 780.

In some embodiments, the score prediction model may be obtained by joint training of the depth branch 720, the breadth branch 740, and the output layer 760. Training samples include information of parking lots selected by at least one user and information of unselected parking lots near the selected parking lots (e.g., within a preset distance range), and the training samples also include a plurality of groups of historical parking records of the parking lots selected by the at least one user. The training samples include user attribute information of the at least one user. The tags of the training samples may be the score of each parking lot. The score of the sample parking lot may also be a value in the interval [0, 1], such as 0.5, 0.7, etc. The number of historical user parking records in the sample parking lot may be obtained, and the score of each sample parking lot may be determined based on the relationship between the number of user parking records of each sample parking lot. For example, the score of the parking lot with the largest number of user parking records in the sample parking lot is set as 1, and the scores of the rest of the sample parking lots are decreased according to the number of user parking records. The tags may be determined in various ways, which are not limited in this disclosure. The tags may be labelled manually or in other feasible ways.

When the depth branch 720, the breadth branch 740 and the output layer 760 are jointly trained, the management platform 130 may construct the continuous features 724 and the classification features 726 based on the training samples, and input the continuous features 724 and the classification features 726 to the depth branch 720 for processing, and the depth branch 720 outputs the concatenated features 728 of continuous features and classification features; at the same time, the management platform 130 may construct the parking lot features and the candidate parking lot features selected by the user 742 based on the training samples, and input the parking lot features and the candidate parking lot features selected by the user 742 to the breadth branch 740 for processing, and the breadth branch 740 outputs the combined features 744 of the parking lot features and the candidate parking lot features. Then, the management platform 130 inputs the concatenated features 728 of the continuous features and classification features outputted by the depth branch 720 and the combined features 744 of the parking lot features and the candidate parking lot features outputted by the breadth branch 740 as the training samples of the output layer 760 to the output layer 760, and constructs a loss function based on the output and the tags of the output layer 760, and simultaneously iteratively update the parameters of an initial score prediction model 700 based on the loss function. Until the preset conditions are completed, the trained score prediction model 700 is obtained. The preset conditions may be that the loss function is less than the threshold, converges, or the training period reaches the threshold.

In some embodiments of the present disclosure, by combining the relevant features of the parking lot with the user features, and the user's choice of the parking lot, the score prediction model is used to determine the score of the candidate parking lot, which may make the score of the candidate parking lot more accurate. At the same time, processing based on the score prediction model may reduce the manpower and time cost brought by manual analysis, and improve efficiency.

The basic concept has been described above. Obviously, for technicians skilled in the art, the above detailed disclosure is only an example, and does not constitute a limitation of the present disclosure. Although not explicitly described herein, various modifications, improvements, and corrections to this disclosure may occur to the technicians skilled in the art. Such modifications, improvements, and corrections are suggested in this disclosure, so such modifications, improvements, and corrections still belong to the spirit and scope of the exemplary embodiments of this disclosure.

At the same time, this disclosure uses specific words to describe the embodiments of this disclosure. For example, "one embodiment," "an embodiment," and/or "some embodiments" mean a certain feature, structure, or characteristic associated with at least one embodiment of this disclosure. Therefore, it should be emphasized and noted that two or more references to "an embodiment" or "one embodiment" or "an alternative embodiment" in various places in this disclosure are not necessarily referring to the same embodiment. Furthermore, certain features, structures, or characteristics of the one or more embodiments of this disclosure may be combined as appropriate.

Furthermore, unless explicitly stated in the claims, the order of processing elements and sequences described in this disclosure, the use of numbers and letters, or the use of other names is not intended to limit the order of the processes and methods of this disclosure. While the foregoing disclosure discusses some embodiments of the disclosure presently believed to be useful by way of various examples, it is to be understood that such details are for purposes of illustration only and that the appended claims are not limited to the disclosed embodiments, but rather the claims are intended to cover all modifications and equivalent combinations that fall within the spirit and scope of the embodiments of this disclosure. For example, although the implementation of various components described above may be embodied in a hardware device, it may also be implemented as a software only solution, e.g., an installation on an existing server or mobile device.

Similarly, it should be noted that, in order to simplify the expressions disclosed in this disclosure and thus help the understanding of one or more embodiments of the disclosure, in the foregoing description of the embodiments of this disclosure, various features may sometimes be combined into one embodiment, in the drawings or descriptions thereof. However, this method of disclosure does not imply that the subject matter of the disclosure requires more features than those recited in the claims. Rather, claimed subject matter may lie in less than all features of a single foregoing disclosed embodiment.

Some embodiments use numbers to describe quantities of ingredients and attributes, it should be understood that such numbers used to describe the embodiments, in some examples, use the modifiers "about", "approximately" or "substantially" to retouch. Unless stated otherwise, "about", "approximately" or "substantially" means that a variation of ±20% is allowed for the stated number. Accordingly, in some embodiments, the numerical parameters set forth in the disclosure and claims are approximations that may vary depending upon the desired features of individual embodiments. In some embodiments, the numerical parameters should consider the specified significant digits and use a general digit reservation method. Notwithstanding that the numerical fields and parameters used in some embodiments of this disclosure to confirm the breadth of their ranges are approximations, in specific embodiments such numerical values are set as precisely as practicable.

For each patent, patent application, patent application publication, and other material, such as articles, books, specifications, publications, documents, etc., cited in this disclosure, the entire contents are hereby incorporated into this disclosure for reference. Application history documents that are inconsistent with or conflict with the contents of this disclosure are excluded, as are documents (currently or hereafter appended to this specification) limiting the broadest scope of the claims of this disclosure. It should be noted that, if there is any inconsistency or conflict between the descriptions, definitions, and/or usage of terms in the accompanying materials of this disclosure and the contents of this disclosure, the descriptions, definitions and/or usage of terms in this disclosure shall prevail.

Finally, it should be understood that the embodiments described in this disclosure are only intended to illustrate the principles of the embodiments of this disclosure. Other variations are also possible within the scope of this disclosure. Accordingly, by way of example and not limitation, alternative configurations of the embodiments of this disclosure may be considered consistent with the instructions of this disclosure. Correspondingly, the embodiments of this disclosure are not limited to the embodiments expressly introduced and described in this disclosure.

What is claimed is:

1. A method for recommending a parking lot in a smart city, implemented based on an Internet of Things system for recommending the parking lot in the smart city, including:

determining an arrival duration of a user reaching at least one candidate parking lot and a prediction time period corresponding to each candidate parking lot in the at least one candidate parking lot based on a user request;

determining an occupation rate of the candidate parking lot during the prediction time period; and determining a recommended parking lot at least based on the occupation rate of the candidate parking lot during the prediction time period and parking lot information of the candidate parking lot;

wherein the parking lot information further includes at least one of a historical occupation rate of the parking lot, a parking lot capacity, and surrounding event holding information; and the determining the occupation rate of the candidate parking lot during the prediction time period includes:

constructing a parking lot feature vector corresponding to the candidate parking lot based on the parking lot capacity of the candidate parking lot, an internal structure of the parking lot, and the surrounding event holding information during the prediction time period;

obtaining a reference historical vector through retrieving in a vector database based on the parking lot feature vector; and using the historical occupation rate of the parking lot corresponding to the reference historical vector as the occupation rate of the candidate parking lot during the prediction time period.

2. The method of claim 1, wherein the Internet of Things system for recommending the parking lot in the smart city also includes a user platform, a management platform, a service platform, a sensor network platform, and an object platform;

the management platform includes a general database and a plurality of management sub-platforms;

the sensor network platform includes a plurality of sensor network sub-platforms;

the user request is obtained based on the user platform, and transmitted to the general database of the management platform based on the service platform;

the parking lot information is obtained based on the object platform, transmitted to the corresponding management sub-platforms based on the corresponding sensor network sub-platforms, and uploaded to the general database by the management sub-platforms; and the method further includes:

transmitting the recommended parking lot to the user platform based on the service platform.

3. The method of claim 1, wherein the user request includes at least one of a current vehicle location, an estimated departure time, and an estimated stay time;

the prediction time period includes a time period of time when the user arrives at the candidate parking lot or a time period of time when the user leaves the candidate parking lot; and the prediction time period is determined based on the arrival duration of the user reaching the candidate parking lot and the user request.

4. The method of claim 3, wherein the parking lot information includes at least one of an internal structure of the parking lot and a charging standard;

the determining the recommended parking lot includes:

determining the recommended parking lot at least based on the occupation rate of the candidate parking lot during the prediction time period, the internal structure of the candidate parking lot, the charging standard, and the arrival duration of the user reaching the candidate parking lot.

5. The method of claim 1, wherein the parking lot information further includes a historical number of entry and exit vehicles of the candidate parking lot; and the determining the occupation rate of the candidate parking lot during the prediction time period further includes:

verifying the occupation rate of the candidate parking lot during the prediction time period based on the historical number of entry and exit vehicles corresponding to the candidate parking lot within a first historical time period; and determining a final occupation rate of the candidate parking lot during the prediction time period based on a verification result.

6. The method of claim 5, wherein the verifying the occupation rate of the candidate parking lot during the prediction time period based on the historical number of entry and exit vehicle corresponding to the candidate parking lot within a first historical time period includes:

obtaining the historical number of entry and exit vehicle corresponding to the candidate parking lot within the first historical time period, and constructing a vehicle flow feature vector corresponding to the first historical time period;

predicting a predicted number of entry and exit vehicle corresponding to a second historical time period through conducting vector retrieval in a historical database based on the vehicle flow feature vector; and determining whether a predicted occupation rate of the candidate parking lot during the prediction time period is reasonable based on a difference between the predicted number of entry and exit vehicle within the second historical time period and an actual number of entry and exit vehicle within the second historical time period;

the determining the final occupation rate of the candidate parking lot during the prediction time period based on the verification result includes:

in response to a determination that the predicted occupation rate of the candidate parking lot during the prediction time period is reasonable, using the predicted occupation rate of the candidate parking lot during the prediction time period as the final occupation rate; and in response to a determination that the predicted occupation rate of the candidate parking lot during the prediction time period is not reasonable, adjusting the predicted occupation rate of the candidate parking lot during the prediction time period, and using the adjusted occupation rate as the final occupation rate.

7. The method of claim 1, wherein the determining a recommended parking lot at least based on the occupation rate of the candidate parking lot during the prediction time period and parking lot information of the candidate parking lot includes:

determining at least one evaluation factor and a score corresponding to each evaluation factor in the at least one evaluation factor based on the occupation rate of the candidate parking lot during the prediction time period and the parking lot information of the candidate parking lot;

determining a weight value corresponding to each evaluation factor, and determining a score of the candidate parking lot based on the weight value of each evaluation factor and the score of each evaluation factor; and determining the recommended parking lot based on the score of the candidate parking lot.

8. The method of claim 7, wherein the at least one evaluation factor includes: at least one of the occupation rate of the candidate parking lot during the prediction time period, an internal structure of the candidate parking lot, a charging standard, and the arrival duration.

9. The method of claim 1, wherein the determining a recommended parking lot at least based on the occupation rate of the candidate parking lot during the prediction time period and parking lot information of the candidate parking lot includes:
  determining a score of the candidate parking lot through processing parking lot features, candidate parking lot features, and user features historically selected by the user through a score prediction model, wherein the score prediction model is a machine learning model;
  determining a first recommendation based on the score of the candidate parking lot; and
  determining a second recommendation in the first recommendation as the recommended parking lot in combination with the occupation rate of the candidate parking lot during the prediction time period and the corresponding arrival duration in the first recommendation.

10. An Internet of Things system for recommending a parking lot in a smart city, including a management platform, wherein the management platform is configured to:
  determine an arrival duration of a user reaching at least one candidate parking lot and a prediction time period corresponding to each candidate parking lot in at least one candidate parking lot based on a user request;
  determine an occupation rate of the candidate parking lot during the prediction time period; and
  determine a recommended parking lot at least based on the occupation rate of the candidate parking lot during the prediction time period and parking lot information of the candidate parking lot;
  wherein the parking lot information further includes at least one of a historical occupation rate of the parking lot, a parking lot capacity, and surrounding event holding information; and
  the management platform is further configured to:
  construct a parking lot feature vector corresponding to the candidate parking lot based on the parking lot capacity of the candidate parking lot, an internal structure of the parking lot, and surrounding event holding information during the prediction time period;
  obtain a reference historical vector through retrieving in a vector database based on the parking lot feature vector; and
  use the historical occupation rate of the parking lot corresponding to the reference historical vector as the occupation rate of the candidate parking lot during the prediction time period.

11. The system of claim 10, wherein the system further includes a user platform, a management platform, a service platform, a sensor network platform, and an object platform;
  the management platform includes a general database and a plurality of management sub-platforms;
  the sensor network platform includes a plurality of sensor network sub-platforms;
  the user request is obtained based on the user platform, and transmitted to the general database of the management platform by the service platform;
  the parking lot information is obtained based on the object platform, transmitted to the corresponding management sub-platforms based on the corresponding sensor network sub-platforms, and uploaded to the general database by the management sub-platforms; and
  the service platform transmits the recommended parking lot to the user platform.

12. The system of claim 10, wherein the user request includes at least one of a current vehicle location, an estimated departure time, and an estimated stay time;
  the prediction time period includes a time period of time when the user reaches the candidate parking lot or a time period of time when the user leaves the candidate parking lot; and
  the prediction time period is determined based on the arrival duration of the user reaching the candidate parking lot and the user request.

13. The system of claim 12, wherein the parking lot information includes at least one of an internal structure of the parking lot and a charging standard;
  the management platform is further configured to:
  determine the recommended parking lot at least based on the occupation rate of the candidate parking lot during the prediction time period, the internal structure of the candidate parking lot, the charging standard, and the arrival duration of the user reaching the candidate parking lot.

14. The system of claim 10, wherein the parking lot information further includes a historical number of entry and exit vehicles of the candidate parking lot; and
  the management platform is further configured to:
  verify the occupation rate of the candidate parking lot during the prediction time period based on the historical number of entry and exit vehicles corresponding to the candidate parking lot within a first historical time period; and
  determine a final occupation rate of the candidate parking lot during the prediction time period based on a verification result.

15. The system of claim 14, wherein the management platform is further configured to:
  obtain the historical number of entry and exit vehicles corresponding to the candidate parking lot within the first historical time period, and construct a vehicle flow feature vector corresponding to the first historical time period;
  predict a predicted number of entry and exit vehicles corresponding to a second historical time period through conducting vector retrieval in a historical database based on the vehicle flow feature vector;
  determine whether a predicted occupation rate of the candidate parking lot during the prediction time period is reasonable based on a difference between the predicted number of entry and exit vehicles within the second historical time period and an actual number of entry and exit vehicles within the second historical time period;
  in response to a determination that the predicted occupation rate of the candidate parking lot during the prediction time period is reasonable, use the predicted occupation rate of the candidate parking lot during the prediction time period as the final occupation rate; and
  in response to a determination that the predicted occupation rate of the candidate parking lot during the prediction time period is not reasonable, adjust the predicted occupation rate of the candidate parking lot during the prediction time period, and use the adjusted occupation rate as the final occupation rate.

16. The system of claim 10, wherein the management platform is further configured to:
  determine at least one evaluation factor and a score corresponding to each evaluation factor in the at least one evaluation factor based on the occupation rate of the candidate parking lot during the prediction time period and the parking lot information of the candidate parking lot;

determine a weight value corresponding to each evaluation factor, and determine a score of the candidate parking lot based on the weight value of each evaluation factor and the score of each evaluation factor; and determine the recommended parking lot based on the score of the candidate parking lot.

17. The system of claim 10, wherein the management platform is further configured to:

determine a score of the candidate parking lot through processing parking lot features, candidate parking lot features, and user features historically selected by the user through a score prediction model, wherein the score prediction model is a machine learning model;

determine a first recommendation based on the score of the candidate parking lot; and determine a second recommendation in the first recommendation as the recommended parking lot in combination with the occupation rate of the candidate parking lot during the prediction time period and the corresponding arrival duration in the first recommendation.

18. A non-transitory computer readable storage medium, wherein the storage medium stores computer instructions, and when a computer reads the computer instructions, the computer executes a method for recommending a parking lot in a smart city, including:

determining an arrival duration of a user reaching at least one candidate parking lot and a prediction time period corresponding to each candidate parking lot in the at least one candidate parking lot based on a user request;

determining an occupation rate of the candidate parking lot during the prediction time period; and determining a recommended parking lot at least based on the occupation rate of the candidate parking lot during the prediction time period and parking lot information of the candidate parking lot;

wherein the parking lot information further includes at least one of a historical occupation rate of the parking lot, a parking lot capacity, and surrounding event holding information; and the determining the occupation rate of the candidate parking lot during the prediction time period includes:

constructing a parking lot feature vector corresponding to the candidate parking lot based on the parking lot capacity of the candidate parking lot, an internal structure of the parking lot, and the surrounding event holding information during the prediction time period;

obtaining a reference historical vector through retrieving in a vector database based on the parking lot feature vector; and using the historical occupation rate of the parking lot corresponding to the reference historical vector as the occupation rate of the candidate parking lot during the prediction time period.

* * * * *